Figure 1:
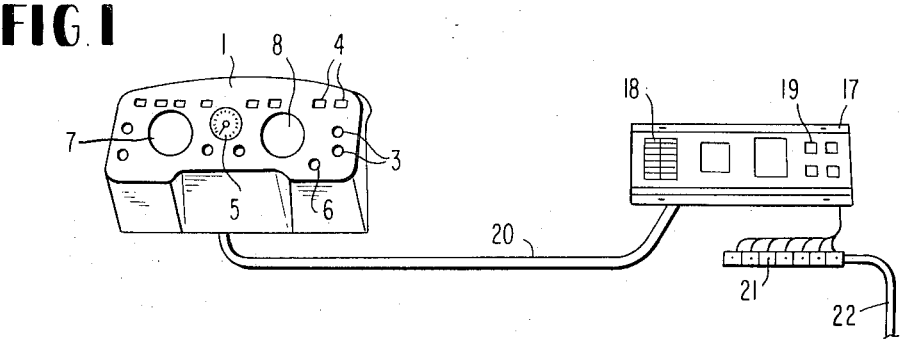

United States Patent [19]

Letzel et al.

[11] 3,797,605
[45] Mar. 19, 1974

[54] INSTRUMENT PANEL FOR MOTOR VEHICLES, ESPECIALLY TRUCKS

[75] Inventors: Karl Letzel, Sindelfingen; Helmut Stober, Doffingen; Elmar Nickel, Sindelfingen, all of Germany

[73] Assignee: Daimler-Benz AG, Stuttgart-Untertuerkheim, Germany

[22] Filed: June 2, 1972

[21] Appl. No.: 259,237

[30] Foreign Application Priority Data
June 4, 1971    Germany............................ 2127686

[52] U.S. Cl. ................................................ 180/90
[51] Int. Cl. ............................................ B60k 37/02
[58] Field of Search .......... 180/90; 240/8.6; 296/70, 296/71, 72

[56] References Cited
UNITED STATES PATENTS
3,022,447  2/1962  Henss................................ 180/90 X
3,270,831  9/1966  Woofter et al....................... 180/90

Primary Examiner—Stanley H. Tollberg
Attorney, Agent, or Firm—Craig and Antonelli

[57] ABSTRACT

An instrument panel for motor vehicles, especially for trucks which includes a covering adapted to be mounted on a railing of the driver cab and which is equipped with instruments serving for the monitoring and actuation of the vehicle, of which at least one instrument is an indicating instrument driven travel-dependent by way of a flexible shaft; at least a large portion of the monitoring and actuating instruments — with the exception of the indicating instrument driven by way of the flexible shaft — are combined within an instrument carrier as a pre-assembled unit while the indicating instrument driven by way of the flexible shaft is connected with the railing of the driver cab independently of the instrument carrier and is covered off by a part of the covering which belongs to the instrument carrier and which is provided with a corresponding aperture.

38 Claims, 4 Drawing Figures

PATENTED MAR 19 1974    3,797,605

INSTRUMENT PANEL FOR MOTOR VEHICLES, ESPECIALLY TRUCKS

The present invention relates to an instrument panel for vehicles, especially commercial vehicles such as trucks, which includes a covering adapted to be mounted on a railing of the driver cab and which is equipped with instruments serving for the monitoring and actuation of the vehicle, of which at least one is an instrument driven travel-dependent by way of a flexible shaft, whereby the instruments are partially combined into a pre-assembled unit including a portion of the covering.

In a known construction of this type, a combination instrument is provided which includes the indicating instrument driven travel-dependent by way of flexible shaft and control lights and which forms together with a part of the covering a preassembled unit that is to be tightened with respect to the remaining part of the covering that is mounted at the railing of the driver cab. Every installation or removal of the preassembled unit into and out of the covering requires in the known prior art construction not only the disconnection of tightening screws or bolts located in hidden areas and accessible only with difficulties, but also the connection or disconnection of the flexible shaft with or from the indicating instrument which also has to be carried out in an area that cannot be viewed. During this work as well as also during the exchange of the small lamps of the control lights which also has to take place according to feel, a deformation of the flexible shaft may readily happen which will impair the length of life thereof and will lead to a failure or breaking thereof. However, in particular an exact predetermined location of the flexible shaft cannot be maintained under these circumstances so that the flexible shaft under certain circumstances may be in a relatively unfavorable position with respect to the instrument. Again, this may have as a consequence, shaft failures.

The present invention is now concerned with the task to so construct an instrument panel of the aforementioned type that not only the assembly and possible repair and maintenance operations can be carried out rapidly and easily but also a completely satisfactory relocation of the flexible shaft is assured which is not impaired during possible repair or maintenance operations that become necessary at the instruments.

This is achieved according to the present invention in that the monitoring and actuating instruments, with the exception of the indicating instrument driven by way of a flexible shaft, are combined at least in their majority into a unit preassembled in an instrument support or carrier and that the instrument driven by way of a flexible shaft is connected with the railing such as window railing of the driver cab independently of the instrument support or carrier and is covered off by the portion of the covering which belongs to the instrument support and is provided with a corresponding aperture. By reason of the fact that the indicating instruments which are driven by way of a flexible shaft are adapted to be secured at the chassis of the vehicle independently of the instrument support unit and can be mounted thereat during the assembly with a completely satisfactory accessibility, a completely satisfactory location of the flexible shaft can be assured in the first instance. Furthermore, this shaft location is maintained independently of whether the instrument support is now installed into the instrument panel or is removed for servicing and repair operations. In a similar manner, also a completely satisfactory, easy assembly of the electrical indicating instruments coordinated to the instrument support can be ensured in the solution according to the present invention whereby the instrument support which represents a pre-assembled unit, can also be removed without difficulty for the maintenance and repair work at the electrical instruments, on the one hand, and the indicating instrument driven by way of a flexible shaft, on the other, without having to fear any impairments of the over-all construction.

A tachometer and/or a tachograph or a corresponding combination instrument are thereby contemplated in particular as instruments driven by way of a flexible shaft within the scope of the present invention. The fastening of the indicating instrument at the railing of the motor vehicle takes place appropriately by way of a bracket which, within the purview of the present invention, may serve simultaneously as an abutment for the instrument support so that the latter receives an additional support within the area, within which it is relatively weakened by the presence of the aperture for the indicating instrument.

In addition to the indicating instrument driven by way of a flexible shaft, appropriately also those indicating instruments are mounted according to the present invention at the railing of the driver cab independently of the instrument support, which are operatively connected or in communication with parts of the vehicle by way of lines, i.e., again mechanically. Among those are the oil pressure manometer and/or the compressed air manometer. Appropriately, these instruments are combined into a combination instrument which is arranged on a bracket in the railing like the indicating instrument driven travel-dependent by way of a flexible shaft, so that a good access exists to the coupling nuts provided in the connection between instrument and lines, and a support for the instrument support or carrier can also be achieved in this case by the bracket, which instrument support or carrier is weakened within this area by the relatively large aperture for the instrument.

For the purpose of facilitating the accessibility during repair work and maintenance operations, it is additionally appropriate within the scope of the present invention if the instrument carrier or support representing a preassembled unit, is pivotally mounted at the railing of the motor vehicle.

In order not to overload the instrument support by the many electrical fuse- and switch-elements coordinated to the monitoring- and actuating-instruments of which a large number is required especially in trucks, and in order not to permit that these monitoring and actuating instruments become difficult to supervise, while at the same time achieving in an advantageous manner a pre-assembled unit both for the monitoring- and actuating-instruments as also for the fuse- and switch-elements coordinated thereto or belonging generally to the electrical system of the vehicle, it is appropriate within the frame of the present invention if a support plate is provided for the fuse- and switch-elements such as fuses, relays or the like, which forms a pre-assembled unit together with the fuse- and switch-elements. If the cables extending between the monitoring and actuating instruments provided at the instrument support or carrier and the support plate are combined into a cable trunk, then according to the present invention, the instrument support or carrier together with the associated monitoring- and actuating-instruments, the support plate together with the fuse- and switch-elements arranged thereat, and the cable-trunk may form an assembly unit which is to be installed in the driver cab pre-assembled as a connected-up unit and which preferably is to be connected with a cable set belonging to the vehicle chassis preferably by way of a multi-plug connection. This construction according to the present invention leads to an over-all construction favorable both as regards the vehicle assembly as also as regards repair and maintenance operations.

Appropriately, the over-all design is additionally so constructed that not only the indicating instrument driven by way of a flexible shaft but also the support plate are so mounted as a pre-assembled unit at the railing that these parts mounted at the railing of the vehicle are covered off by parts belonging to the covering of the instrument panel in such a manner that a good accessibility is assured at any time. Whereas this can be assured with respect to the instrument driven by way of a flexible shaft in its simplest manner by a pivotal mounting of the instrument support or carrier which forms a part of the covering, it is appropriate to coordinate to the support plate a detachable and preferably pivotally arranged cover forming a part of the instrument panel covering. The instrument support or carrier and the cover are appropriately so constructed that they form in relation to the longitudinal dimension of the instrument panel one longitudinal section each of the covering thereof.

With respect to a favorable space subdivision, it is thereby advantageous if the instrument carrier and the support plate are arranged at a distance to one another in relation to the longitudinal dimension of the instrument panel and if a warm and/or cold air supply with associated adjusting elements is provided between these parts, to which is coordinated a separate section of the instrument panel covering. This section laterally adjoins preferably directly the instrument support or carrier, on the one hand, and the cover coordinated to the support plate, on the other, and is adapted to be secured independently of these parts.

As a result of such a breakdown of the instrument panel, smaller units result for the covering thereof so that the latter can be manufactured relatively favorably and are exchangeable also in individual parts. This can be achieved in a particularly simple manner if the instrument carrier, the cover of the support plate and the section disposed therebetween form each a longitudinal section of the covering of the instrument panel which covers off the railing. Preferably the individual sections of the instrument panel covering are made of identical materials and also especially of elastic hard-foamed materials of known conventional type so that they also offer a good protection against injuries.

Accordingly, it is an object of the present invention to provide an instrument panel for motor vehicles, especially trucks, which avoids by simple means the aforementioned shortcomings and drawbacks encountered in the prior art.

Another object of the present invention resides in an instrument panel for commercial types of motor vehicles which facilitates the assembly and repair or maintenance of the various parts thereof while at the same time permitting a predetermined lay-out of the mechanical connections of those instruments which are mechanically connected with other parts of the vehicle.

A further object of the present invention resides in an instrument panel for motor vehicles, especially for trucks in which long life is assured for the flexible shafts driving certain indicating instruments thereof.

A still further object of the present invention resides in an instrument panel of the type described above in which damage and eventual failure of flexible shafts and/or lines is effectively prevented by appropriate predetermined location of these parts which can be maintained even in case of repair needs.

Another object of the present invention resides in an instrument panel which greatly facilitates not only the assembly thereof but also possible repair and maintenance operations that have to be carried out.

Still another object of the present invention resides in an instrument panel for commercial types of vehicles which provides a meaningful and appropriate subdivision of the same into pre-assemblable parts without impairing the neatness and good visibility of the various instruments and actuating devices.

Another object of the present invention resides in an instrument panel for trucks which assures good accessibility to all parts thereof.

Figure 2:
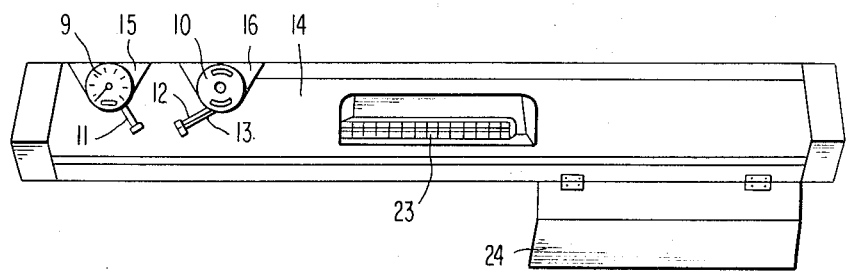
Figure 3:
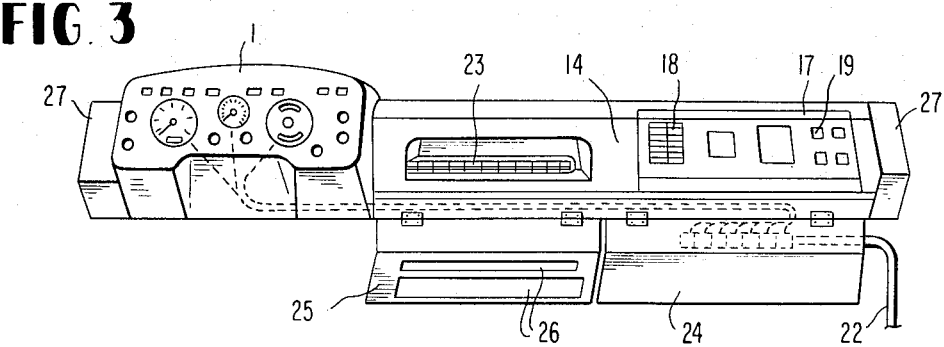
Figure 4:
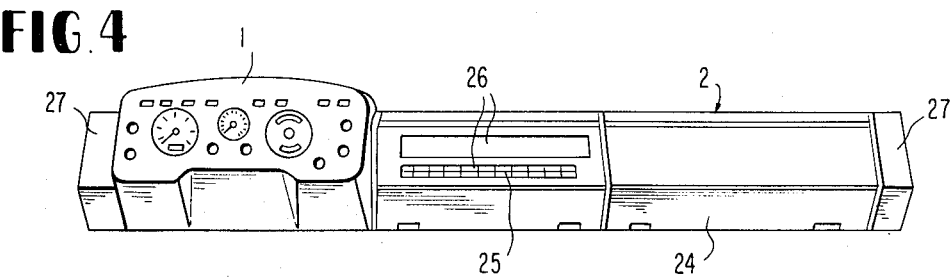

These and further objects, features and advantages of the present invention will become more apparent from the following description when taken in connection with the accompanying drawing, which shows, for purposes of illustration only one embodiment in accordance with the present invention, and wherein:

FIG. 1 is a schematic perspective view of an instrument support forming a component of a covering of an instrument panel as well as of a support plate coordinated to the instrument support for the fuse- and switch-elements associated with the electrical system of the motor vehicle in accordance with the present invention which are connected with the electrical monitoring and actuating instruments provided at the instrument panel within the area of the instrument support by way of cables combined into a cable trunk;

FIG. 2 is a schematic perspective view of the railing of a driver cab on which, on the one hand, an indicating instrument driven travel-dependent by way of a flexible shaft and a further combination instrument, which receives an oil pressure and an air pressure manometer and which is connected with corresponding lines, are arranged by way of brackets and on which, on the other, the support plate in accordance with the present invention is to be secured;

FIG. 3 is a schematic perspective view in which the assembly unit constituted by the instrument support, the support plate and the cable trunk connecting the same is mounted on the railing according to FIG. 2; and FIG. 4 is a schematic perspective view of a completely assembled instrument panel according to the present invention provided with a complete covering thereof.

Referring now to the drawing wherein like reference numerals are used throughout the various views to designate like parts, and more particularly to FIG. 1, in this figure reference numeral 1 designates an instrument support or carrier which forms a part of the covering of an instrument panel generally designated by reference numeral 2 (FIG. 4) for a motor vehicle and which receives a number of electrical monitoring and actuating instruments, for example, switches 3, control lights 4 and a rotational speed-measuring device 5. Furthermore, in the illustrated embodiment, an ignition lock 6 as well as two apertures 7 and 8 are provided in the instrument support 1. Two instruments 9 and 10 (FIG. 2) are coordinated to these apertures 7 and 8, of which the instrument 9 is driven travel-dependent by way of a flexible shaft 11 and is constructed as a combination instrument which includes the tachometer and the tachograph. The instrument 10 is also constructed in the illustrated embodiment as combination instrument and includes an air pressure manometer as well as an oil pressure manometer. Corresponding lines which in the illustrated embodiment are designated by reference numerals 12 and 13, are coordinated to these manometers, which are connected in the usual manner with the manometers by way of coupling nuts, not further illustrated in detail herein. Since the instruments 9 and 10 are mounted on the window railing 14 of the driver cab of conventional construction (not shown), and more particularly by way of brackets 15 and 16, and are connected with the brackets 15 and 16 before the instrument support 1 forming a part of the covering of the instrument panel is assembled over the railing 14, a completely satisfactory access to the instruments 9 and 10 exists during the installation of these instruments. An exact location of the flexible shaft 11 is possible thereby. Furthermore, also a favorable connection of the lines 12 and 13 to the manometers combined in the instrument 10 is possible thereby. The possibility of an accurate location for the flexible shaft 11 is particularly significant as shaft failures or breakages can be prevented thereby. Since the instruments 9 and 10 are connected with the railing 14 by way of their brackets 15 and 16 and since the remaining monitoring- and actuating-instruments to which are coordinated electrical transmitting means, are combined within the instrument support 1, in the solution according to the present invention a simple monitoring, servicing, and repair of the monitoring and actuating devices 3 to 6 combined within the instrument support 1 as also of the instruments 9 and 10 connected with the railing 14 is possible without reciprocal influencing by reason of the fact that the instrument support 1 is readily removable. Furthermore, the given subdivision and breakdown also enables the construction of the instrument support 1 as pre-assembled unit so that the installation of the instrument panel on the assembly line requires only little time accordingly during the manufacture of the vehicle.

The apertures 7 and 8 provided in the instrument support 1 are so dimensioned that they laterally surround in a fitting manner the instruments 9 and 10 when the instrument support 1 is installed on the railing 14. The brackets 15 and 16 form a rearward abutment and support for the instrument support 1 when the latter is mounted on the railing 14 and laterally surrounds the instruments 9 and 10 so that the instrument support 1 can be constructed relatively thin-walled notwithstanding the many monitoring- and actuating-instruments arranged therein as well as the apertures 7 and 8 provided therein. Foamed material of conventional type and provided on the visible side with a covering film or foil is thereby used as material for the instrument support 1 which forms a part of the covering of the instrument panel 2, as also for the remaining parts of the covering of the instrument panel 2 which will be described more fully hereinafter.

The fuse- and switch-elements belonging to the electrical system of the motor vehicle are arranged in the illustrated embodiment of the present invention on a support plate 17 and form together with the same a pre-assembled unit which is preferably mounted at the railing 14 within the area in front of the co-driver seat (not shown), especially by threaded connections (FIG. 3), whereas the instrument support 1 is normally provided within the area in front of the driver seat, also not shown. The connection between the fuse- and switch-elements provided on the support plate 17, for example, the fuses 18 and the relays 19, and the corresponding instruments provided at the instrument support 1 takes place by way of electric cables which are combined into a cable trunk 20. The cables leading from the support plate 17 to the loads or generators are, as also schematically indicated, preferably connected with a cable set on the vehicle frame side by way of a conventional multi-plug connection 21 (FIG. 1).

Within the scope of the present invention, the instrument support 1 and the support plate 17 are appropriately connected with each other already prior to the installation into the vehicle by way of the cable trunk 20 and thus form an assembly unit whose mounting in the vehicle requires only very little time.

A warm and/or cold air supply 23 with conventional adjusting levers (not shown) belonging thereto may be provided between the instrument support 1 and the support plate 17 which themselves are provided, respectively, near the ends of the railing 14. In the illustrated embodiment, mutually separate cover-like parts 25 and 24 of the covering of the instrument panel are coordinated to this air supply 23 and the support plate 17, respectively, which are arranged at the railing 14 preferably pivotally in the downward direction by way of hinges so that a rapid and good access to the parts covered thereby is possible at any time. This is significant in particular for the support plate 17 on which, as shown, are arranged also the fuses 18. The cover part 25 that is coordinated to the warm and cold air supply 23 is provided with corresponding apertures 26 (FIGS. 3 and 4) for the air discharge. Of course, it is also possible within the scope of the present invention, which is not illustrated herein, to connect the instrument support 1 pivotally with the railing 14 so that the instrument support 1 can be pivoted in the downward direction in a simple manner, for example, for the exchange of control lights. The location of the instruments 9 and 10 fixed with respect to the railing 14 by way of the brackets 15 and 16 as well as the flexible shaft 11 and lines 12, 13 leading to the same is not impaired thereby.

It can be seen in particular from FIGS. 3 and 4 that noncovered sections 27 of the railing 14 are disposed on the outside, laterally adjacent the instrument support 1 and the support plate 17 or the cover part 24 coordinated thereto. Support handles (not shown) are arranged according to the present invention on these sections 27 which form the lateral termination of the instrument panel and each have a handle disposed in a vertical plane. These handles form the necessary boarding handles required in trucks.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An instrument panel for motor vehicles including a railing means provided in a driver cab, the instrument panel being equipped with a plurality of devices serving the monitoring and actuation of the vehicle, at least one of the devices being an indicating instrument driven travel-dependent by way of a flexible shaft, the improvement comprising: a covering means detachably connected to the railing means, said covering means including an instrument support means for supporting at least a majority of the monitoring and actuating devices as a preassembled unit with the exception of the indicating instrument driven by way of the flexible shaft said indicating instrument driven by way of the flexible shaft being connected with the railing means independently of and behind said instrument support means, said instrument support means being provided with an aperture means for receiving the indicating instrument driven by way of the flexible shaft.

2. An instrument panel according to claim 1, wherein the motor vehicle is a truck.

3. An instrument panel according to claim 2, wherein the railing means is a window parapet.

4. An instrument panel according to claim 1, wherein said indicating instrument driven by way of a flexible shaft is a tachometer.

5. An instrument panel according to claim 1, wherein said indicating instrument driven by way of the flexible shaft is a tachograph.

6. An instrument panel according to claim 1, said indicating instrument driven by way of the flexible shaft is a combination instrument including a tachometer and a tachograph.

7. An instrument panel according to claim 1, wherein a further indicating instrument is arranged at the railing means of the driver cab within the area of the instrument support means, said covering means being provided with a further aperture means for receiving said further indicating instrument in the instrument support means.

8. An instrument panel according to claim 7, wherein said further instrument includes a manometer connected with a pressure line.

9. An instrument panel according to claim 8, wherein said further indicating instrument includes an oil pressure manometer.

10. An instrument panel according to claim 8, wherein said further indicating instrument includes an air pressure manometer.

11. An instrument panel according to claim 8, wherein said further indicating instrument includes an oil manometer and an air pressure manometer.

12. An instrument panel according to claim 7, wherein bracket means are provided for mounting each indicating instrument at the railing means of the driver cab.

13. An instrument panel according to claim 12, wherein bracket means form an additional support for said instrument support means.

14. An instrument panel according to claim 13, characterized wherein instrument support means is pivotally mounted at the railing means.

15. An instrument panel according to claim 12, wherein the motor vehicle includes an electrical system which includes fuse and switch elements, and wherein a support plate means for supporting said fuse and switch elements as a preassembled unit is provided, said support plate means being secured at the railing means independently of said instrument support means.

16. An instrument panel according to claim 15, wherein means are provided for operatively connecting in that said fuse and switch elements to the monitoring and actuating devices combined in the instrument support means.

17. An instrument panel according to claim 16, wherein said fuse and switch elements include fuses, relays and switches.

18. An instrument panel according to claim 16, wherein said vehicle includes a chassis and wherein said means operatively connecting said fuse and switch elements to the monitoring and actuating devices include cable means combined into a cable trunk, said instrument support means, said support plate means and said cable trunk forming an assembly unit, and wherein a multi-plug connection is provided for connecting said assembly unit with a cable set provided at the vehicle chassis.

19. An instrument panel according to claim 18, wherein a removable cover means forming a component of the instrument panel covering means is provided and attached to the support plate means.

20. An instrument panel according to claim 19, wherein said removeable cover means is pivotally attached at the railing means.

21. An instrument panel according to claim 19, wherein said instrument support means and said support plate means are arranged at a distance to one another in relation to the longitudinal dimension of the instrument panel, and a warm and/or cold air supply means having associated adjusting elements is provided between said instrument support means and said support plate means, and wherein an additional cover means forming a component of the instrument panel covering means is provided.

22. An instrument panel according to claim 21, wherein said additional covering means adjoins directly said instrument support means and said removable cover means attached to said support plate means.

23. An instrument panel according to claim 22, wherein said instrument support means, said removable cover means and said additional covering means each form a longitudinal section of the covering means of the instrument panel thereby covering the railing means.

24. An instrument panel according to claim 23, wherein said removeable cover means is pivotally arranged at the railing means.

25. An instrument panel according to claim 24, wherein said fuse and switch elements operatively connected to the monitoring and actuating devices are combined in the instrument support means.

26. An instrument panel according to claim 25, wherein said indicating instrument driven by way of the flexible shaft is a combination instrument including a tachometer and a tachograph.

27. An instrument panel according to claim 26, wherein said further instrument includes a manometer connected with a pressure line.

28. An instrument panel according to claim 1, wherein bracket means are provided for mounting each indicating instrument at the railing means of the driver cab.

29. An instrument panel according to claim 28, wherein said bracket means form an additional support for the instrument support means.

30. An instrument panel according to claim 1, wherein said instrument support means is pivotally mounted at the railing means.

31. An instrument panel according to claim 1, wherein the motor vehicle includes an electrical system which includes fuse and switch elements, and wherein a support plate means for supporting said fuse and switch elements as a preassembled unit is provided, said support plate means being secured at the railing means independently of said instrument support means.

32. An instrument panel according to claim 31, wherein means are provided for operatively connecting said fuse and switch elements to the monitoring and actuating devices combined in the instrument support means.

33. An instrument panel according to claim 32, wherein said vehicle includes a chassis and wherein said means operatively connecting said fuse and switch elements to the monitoring and actuating devices include cable means combined into a cable trunk, said instrument support means, said support plate means and said cable trunk forming an assembly unit, and wherein a multi-plug connection is provided for connecting said assembly unit with a cable set provided at the vehicle chassis.

34. An instrument panel according to claim 31, wherein a removable cover means forming a component of the instrument panel covering means is provided and attached to the support plate means.

35. An instrument panel according to claim 34, wherein said removeable cover means is pivotally attached at the railing means.

36. An instrument panel according to claim 31, wherein said instrument support means and said support plate means are arranged at a distance to one another in relation to the longitudinal dimension of the instrument panel, and a warm and/or cold air supply means having associated adjusting elements is provided between said instrument support means and said support plate means, and wherein an additional cover means forming a component of the instrument panel covering means is provided.

37. An instrument panel according to claim 36, wherein said additional covering means adjoins directly said instrument support means and said removable cover means attached to said support plate means.

38. An instrument panel according to claim 36, wherein said instrument support means, said removable cover means and said additional covering means each form a longitudinal section of the covering means of the instrument panel thereby covering the railing means.

* * * * *